May 2, 1950     H. A. POWERS     2,506,383
AUTOMOBILE AWNING
Filed June 24, 1948
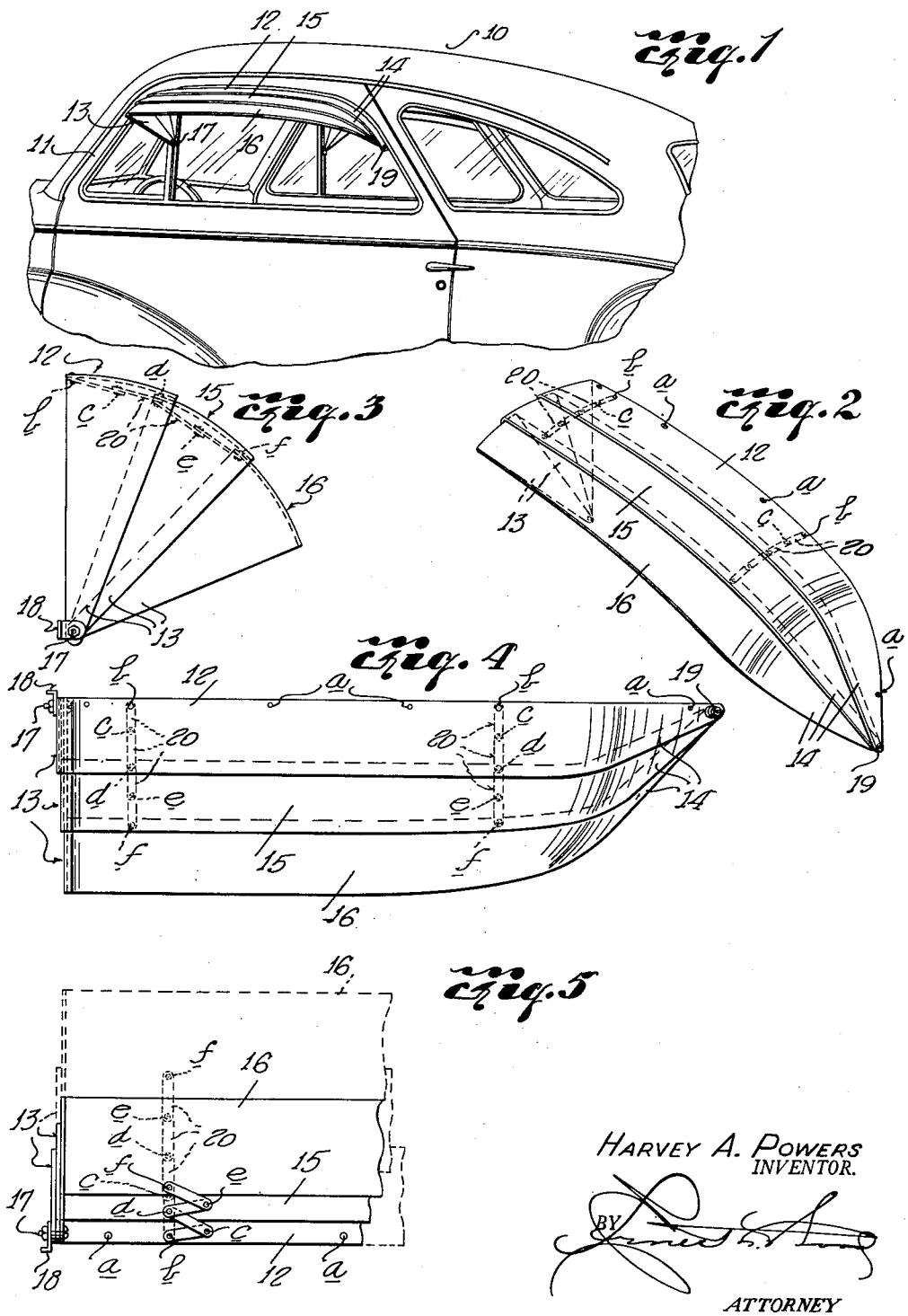
HARVEY A. POWERS
INVENTOR.
BY
ATTORNEY

Patented May 2, 1950

2,506,383

UNITED STATES PATENT OFFICE 2,506,383

AUTOMOBILE AWNING

Harvey A. Powers, Dallas, Tex.

Application June 24, 1948, Serial No. 34,991

2 Claims. (Cl. 160—132)

This invention relates to sunshades and awnings and it has particular reference to an improved collapsible awning for automobiles.

The principal object of the invention is to provide an automobile awning consisting of a plurality of relatively foldable sections having a common pivotal point at each end and provided with one or more series of relatively pivoted links, by which the awning sections are held in extended position, the said links being so arranged that they will be brought automatically into axial alignment when the awning sections are extended, thus preventing rattling of the sections. However, to collapse the awning sections, the links are manually moved to off-centered position and are adapted to fold as the awning sections are telescoped, one under the other.

With the foregoing objects in view, the invention has further reference to certain features of accomplishment which will become apparent as the description proceeds, taken in connection with the accompanying drawing wherein:

Figure 1 is a fragmentary perspective view of an automobile showing the awning installed thereon.

Figure 2 is a top perspective view of the awning per se.

Figure 3 is an end elevational view of the awning.

Figure 4 is a top plan view thereof, and

Figure 5 is a fragmentary bottom plan view of the awning showing folded and extended positions of the awning sections and stiffening links.

Continuing with a more detailed description of the drawing, reference is primarily made to Figure 1 wherein numeral 10 denotes an automobile on whose door 11 is attached the awning of the invention, the latter consisting of a stationary mounting section 12 which is provided with relatively spaced apertures $a$ along one edge to receive screws, not shown. The apertured edge of the stationary section 12 is placed over or under the door or window molding and the screws which hold the molding serve also to secure the section 12 in place.

The awning sections are identical in shape but are of progressively smaller dimensions from the upper to the lower section. Each section has a tapered end portion 13, turned at right angles to the plane of the section and the opposite end 14 of each section is at an angle to the latter to correspond with the angular side of the door or window opening over which the awning is installed, as exemplified in Figure 1.

Next adjacent the stationary awning section 12 is an intermediate section 15 and an outer or lower section 16. The right angular ends 13 are mounted on a common pivot 17 and on this pivot it mounted an L-shaped bracket 18. The extended portion of the bracket 18 is adapted to be inserted in the channel in which the glass of the window or door is slidably mounted.

The bracket 17 is sufficient to hold the ends 13 of the awning sections against outward displacement with respect to the door frame and since the upper section 12 is secured to the window all the way to the opposite end, there is no tendency of this end of the awning to move in relation to the supporting frame and the extremities of the ends 14 are joined to a common pivot 19.

In order to prevent rattling of the awning sections when extended, two groups of relatively pivoted links 20 are arranged underneath the sections. There are four of these links, two being disposed below the stationary section 12 while the remaining two links are disposed under the intermediate section 15. The innermost link has one end pivoted at $b$ to the inner edge of the stationary awning section 12 while its opposite end is pivotally connected at $c$ to a second link, the latter, in turn, being pivoted at $d$ to the inner edge of the intermediate section 15. Similarly, a third link is pivoted at $d$ at one end and at $e$ to an end of a fourth link 20. The opposite end of the latter link is pivoted at $f$ to the inner edge of the lowermost awning section 16, as shown.

Obviously, when the lowermost awning section 16 is grasped and pulled outwardly from the frame, the links 20 are moved on their respective pivots and fall into a straight line, as shown in Figures 4 and 5 and they remain rigid in this position to hold the awning sections extended until displaced manually from dead center position. While extended, the linkage prevents rattling of the sections and when the sections are collapsed, the links fold into the position shown in Figure 5.

Manifestly, the construction as shown and described is capable of some modification and such modification as may be construed to fall within the scope and meaning of the appended claims is also considered to be within the spirit and intent of the invention.

What is claimed is:

1. A collapsible automobile awning comprising a series of sections, one being stationary and each consisting of an elongated and longitudinally arcuated member having tapered ends, one end being turned at right angles to the plane of the member, the opposite end being obliquely disposed with respect to said member so that the member will conform to the contour of the upper section of an automobile window, a common pivot for the members at each end of said awning, a group of relatively pivoted links adjacent each end of said awning, each group of links being pivoted at its inner and outer ends to the stationary and outermost of said awning sections respectively and at its midsection to an intermediate awning section to be extended when said sections are extended to hold the latter against relative displacement and adapted to fold when said awning sections are folded and means for securing said awning to the frame of an automobile window.

2. In an automobile awning, a stationary and a series of identical movable sections having tapered ends operating on pivots for folding and extending movement, one of each of said sections being disposed at right angles to the longitudinal axis of the section, the opposite end thereof being disposed at an obtuse angle, an assembly of relatively pivoted links under and adjacent each end of said series of sections, the innermost of said links being pivoted to said stationary section, the outermost of said links being pivoted to the outermost of said awning sections, means pivotally connecting the links of said assembly to each other and to an intermediate section of said awning whereby said links will be extended into axial alignment when said sections are extended to hold the latter against relative displacement and means for securing said awning in the frame of an automobile window.

HARVEY A. POWERS.

REFERENCES CITED

The following references are of record in the file of this patent:

UNITED STATES PATENTS

| Number | Name | Date |
| --- | --- | --- |
| 183,671 | Hohorst | Oct. 24, 1876 |
| 1,014,553 | Zellers | Jan. 9, 1912 |
| 1,125,512 | Giusto | Jan. 19, 1915 |
| 1,765,714 | Bulkeley | June 24, 1930 |
| 1,970,886 | Dowd | Aug. 21, 1934 |
| 2,034,342 | Hay | Mar. 17, 1936 |
| 2,213,141 | Mather | Aug. 27, 1940 |